June 23, 1942.    J. G. JACKSON ET AL    2,287,684

MOUNTING MEANS FOR ENCLOSED ELECTRIC DEVICES

Filed Oct. 10, 1938    2 Sheets-Sheet 1

INVENTORS
John G. Jackson,
Ralph H. Kingdon,
BY
Myron J. Seibold
ATTORNEY

June 23, 1942.  J. G. JACKSON ET AL  2,287,684

MOUNTING MEANS FOR ENCLOSED ELECTRIC DEVICES

Filed Oct. 10, 1938  2 Sheets-Sheet 2

INVENTORS.
John G. Jackson,
Ralph H. Kingdon.
BY Myron J. Seibold
ATTORNEY

Patented June 23, 1942

2,287,684

UNITED STATES PATENT OFFICE 2,287,684

MOUNTING MEANS FOR ENCLOSED ELECTRIC DEVICES

John G. Jackson and Ralph H. Kingdon, Detroit, Mich., assignors to Square D Company, Detroit, Mich., a corporation of Michigan Application October 10, 1938, Serial No. 234,092

10 Claims. (Cl. 174—57)

This invention relates to means for mounting an electric circuit instrumentality within an enclosed box and has for its object the provision of a mounting pan which shall be adapted for use with both flush and surface mounted enclosures.

Another object of the invention is to provide an improved adjustable mounting for an electric instrumentality within a flushed mounted enclosure.

Another object of the invention is to provide mounting means for electric instrumentalities having a single rugged adjusting means manipulable so as to properly locate instrumentalities within a flush mounted enclosure.

Another object of the invention is to provide an enclosing and mounting means for an electric instrumentality in which the instrumentalities are movable with respect to the box proper to properly locate the instrumentalities within the enclosure by a single adjusting means.

Another object of the invention is to provide supporting and enclosing means for electric instrumentalities including an enclosing box with a pan upon which said instrumentalities are mounted, being supported by the main body of the box in slidable relation and in which a single adjusting means is provided for properly adjusting the position of the units with respect to the cover by moving the pan relative to the box.

Other objects and features of the invention will be readily apparent to those skilled in the art from the following specification and appended drawings illustrating certain preferred embodiments of the invention in which.

Figure 4:
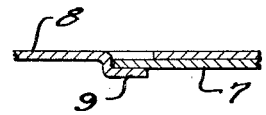
Figure 4 is an enlarged detail sectional view on line III—III of Figure 3.
Figure 5:
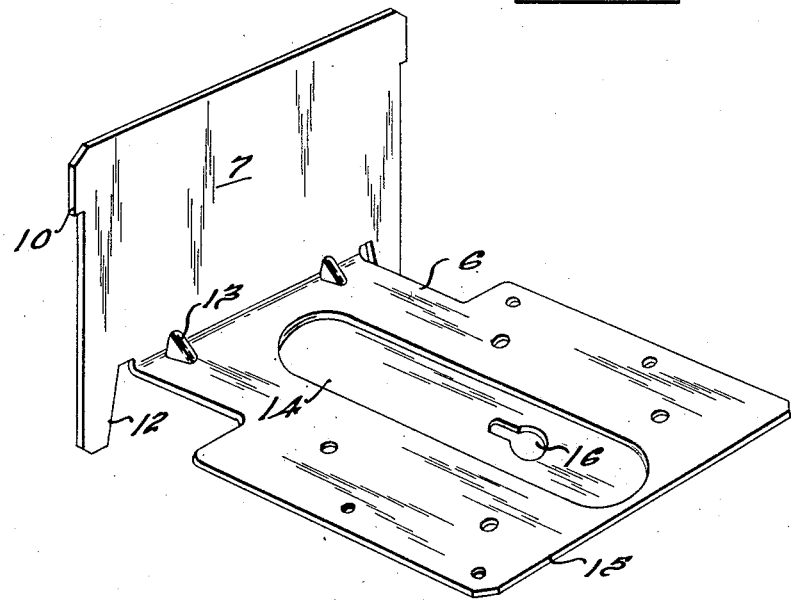
Figure 5 is a perspective view of the mounting pan.

The enclosing and mounting means is illustrated in the drawings in use for a flush mounted device; in this type of mounting, the box is usually buried within the wall before the plaster has been applied and therefore it is undesirable to rigidly locate the mounting pan upon which the electric instrumentalities rest before the thickness of the plaster on the lath is finally determined. Thus the top and bottom walls of the box are provided with front flanges adapted to receive the studs which draw the cover of the box tightly against the plaster wall and thereafter the mounting pan may be properly located with respect to the box cover. An adjusting screw which rotatably engages the mounting pan is provided to obtain movement of the latter; manipulation of the screw adjusts the pan to bring it against the inner surface of the cover or trim. According to the present invention, the enclosing and mounting means embodies an enclosing box 1 having a removable cover 2. The top and bottom walls of said box 1 are provided with front flanges 3 having threaded holes in said flanges to receive studs 4, which studs serve to draw the cover 2 tightly against exterior plaster wall 5. Within the enclosure 1 is disposed a supporting pan 6 generally L-shaped in cross section and having its leg 7 engageable with the interior side wall 8. Guide lugs 9 are pressed out of the side wall 8 of box 1, as shown in Figure 4 and receive leg 7 of pan 8 to properly locate and slidably mount the pan within the box. The part of said leg 7 adjacent the front of box 1 is provided with projecting portions 10 engageable with front guides 9 to limit the interior position of the pan 6 when the enclosing and mounting means described herein is to be surface mounted. The lower extremity of leg 7 is provided with legs 11 and 12 which permit pan 6 to be raised upwardly a substantial amount before becoming disengaged from the guides 9 adjacent the back of box 1, thus permitting the proper adjustment of instrumentalities even though the box 1 be quite deeply buried within the wall.

Figure 1:
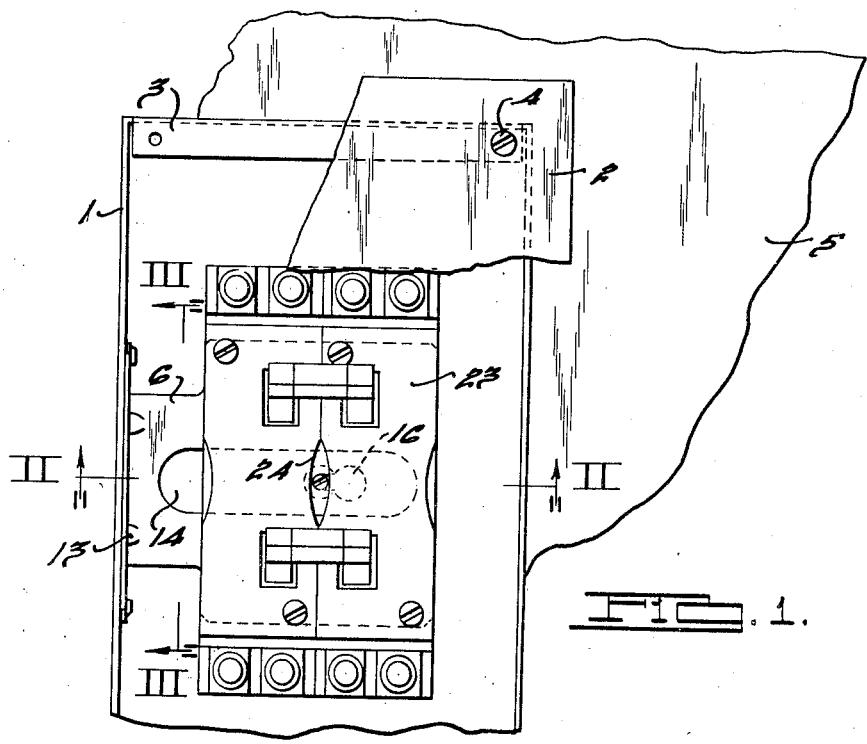
Figure 1 is a front elevational view of the enclosing and mounting means according to the present invention with the instrumentalities in place and a portion of the front cover broken away to show internal parts.
Figure 2:
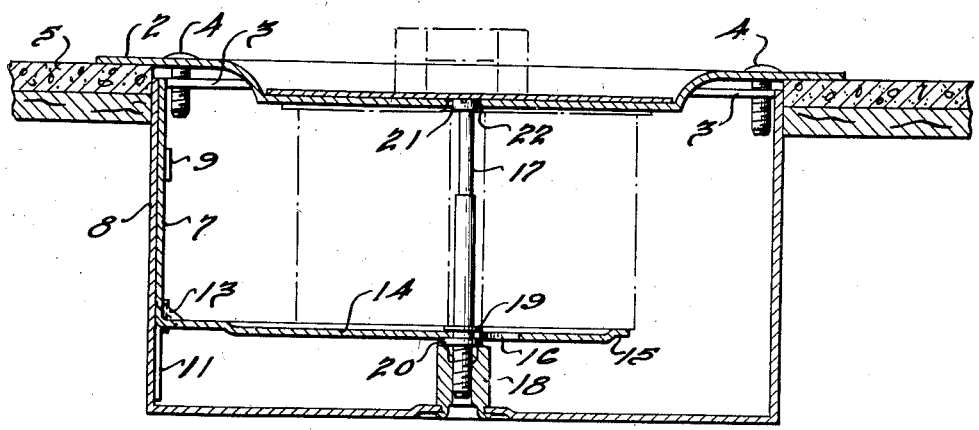
Figure 2 is an enlarged horizontal sectional view on the line II—II of Figure 1.
Figure 3:
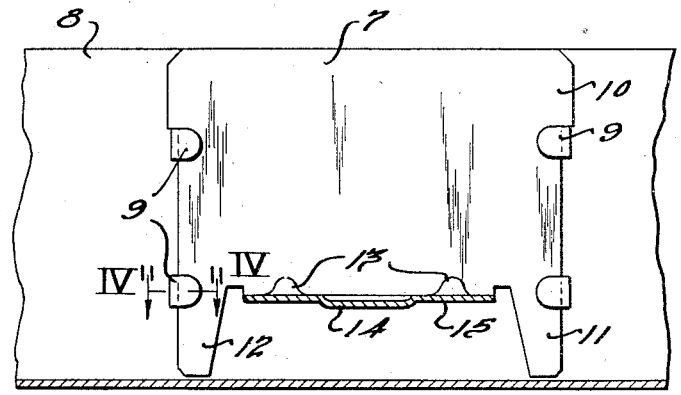
Figure 3 is an enlarged sectional view on line III—III of Figure 1.

The supporting pan 6 is provided with flanges or ribs 13 to lend rigidity and strength to the pan. To further strengthen the pan an elongated indentation 14 is pressed inwardly into the base 15 thereof. For effecting adjusting movement of the pan 6 there is provided a keyhole opening 16 in the base 15 of said pan and an adjusting screw 17 cooperating with a threaded bushing 18 rigidly secured to the back of box 1 and disposed in the narrow portion of keyhole opening 16 with flanges 19 and 20 thereon lying on opposite sides of the pan. The front surface of the front flange portion 19 provided upon adjusting screw 17 lies flush with the front surface of the main body of pan 6 and therefore does not interfere with the position of any instrumentalities upon pan 6; the back flange portion 20 provided upon adjusting screw 17 bears upon the back surface of the pan 6, and said flanges 19 and 20 when adjusting screw 17 is received by the narrow portion of keyhole opening 16 engage pan 6 therebetween to cause movement thereof when the screw 17 is rotated. The attachment of the pan 6 to the adjusting screw 17 and of the latter to the threaded bushing 18 provides a good electrical connection grounding the pan to the box. The adjusting screw 17 possesses a head 21 which is formed larger than the throat of the screw in order that a better engagement might be had with the screw driver. The box cover 2 is provided with an opening 22 into which the head 21 of the adjusting screw 17 fits but the presence of the nameplate upon the cover 2 prevents reaching of the head without the removal of the cover. If it is desired that adjustment be possible with the cover in place, provision may be made to leave an opening in the cover leading to the exterior. The instrumentality 23 shown in Figure 1 are automatic circuit breakers of the type fully described in Patents Nos. 2,096,545, -6, -7, and -8 granted to J. G. Jackson on October 19, 1937, and have their covers provided with openings as at 24 to permit the passage of the screw head 21.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. Supporting and enclosing means for an electric circuit controlling instrumentality comprising an enclosing box, a front cover for said box, a support for said instrumentality slidably mounted within the box and movable in opposite directions in a path perpendicular to the back wall of the box, to adjust the position of the instrumentality with respect to the location of the front cover, and means including a single screw manipulable to effect positive movement of the support in at least a forward direction with respect to said box.

2. Supporting and enclosing means for an electric circuit controlling instrumentality comprising an enclosing box, a front cover for said box, a support for said instrumentality slidably mounted within the box and movable in opposite directions in a path perpendicular to the back wall of the box, to adjust the position of the instrumentality with respect to the location of the front cover, and means including a single manipulable element rotatable with respect to said support and box to positively effect movement of the support in said opposite directions relative to the box.

3. Supporting and enclosing means for an electric circuit controlling instrumentality comprising an enclosing box, a front cover for said box, a support for said instrumentality slidably mounted within the box and movable in opposite directions in a path perpendicular to the back wall of the box to adjust the position of the instrumentality with respect to the location of the front cover, and means including a single manipulable element rotatable with respect to said support and box to positively effect movement of the support in said opposite directions relative to the box, manipulation of said single element being the sole operation necessary for effecting movement of said support and for maintaining the support in its adjusted position.

4. Supporting and enclosing means for an electric circuit controlling instrumentality comprising an enclosing box, a cover for said box, a generally L-shaped pan disposed within said box with its base substantially parallel to the back wall of the box to provide a support for said instrumentality, the leg of the L-shaped pan being slidably engageable with a side wall of the box, guide means rigid with the box side wall and engaging said leg for limiting movement of the pan to a path perpendicular to the back wall of the box to adjust the position of the instrumentality with respect to the location of the front cover, and means including a single manipulable element connecting the base of said pan to the back wall of the box, manipulation of said element providing for movement of the pan relative to the box to properly locate the instrumentality with respect to the front cover.

5. Supporting and enclosing means for an electric circuit controlling instrumentality comprising an enclosing box, a front cover for said box, a generally L-shaped supporting pan disposed within said box with its base parallel to the back wall of the box to provide a support for the instrumentality and with its leg guided upon a side wall of the box for sliding movement of the pan relative to the box in a path perpendicular to the back wall of the box to provide for adjustment of the position of the instrumentality with respect to the location of the front cover, and a single adjusting screw rotatably engageable with said pan and threaded into a part mounted on the box, said adjusting screw being rotatable to positively move the pan relative to the box to properly locate the instrumentality in its desired position, said adjusting screw rigidly maintaining the pan in its adjusted position within the box.

6. Supporting and enclosing means for an electric circuit controlling instrumentality adapted for both flush and surface mounting comprising an enclosing box adapted to cooperate with either flush or surface covers as desired, a supporting pan slidably mounted on said box for movement in opposite directions in a path perpendicular to the back wall of the box, said pan being adapted to have said instrumentality mounted thereon, means limiting the extreme backward movement of the pan to a position properly locating the instrumentality with respect to a surface type cover, and a single adjusting means manipulable to effect positive movement of the pan relative to the box in at least a forward direction whereby the instrumentality mounted on the pan may be properly adjusted with respect to the location of a flush type cover to be associated with the box.

7. Supporting and enclosing means for an electric circuit controlling instrumentality adapted for both flush and surface mounting comprising an enclosing box adapted to cooperate with either flush or surface covers as desired, a supporting pan slidably mounted on said box for movement in opposite directions in a path perpendicular to the back wall of the box, said pan being adapted to have said instrumentality mounted thereon, means limiting the extreme backward movement of the pan to a position properly locating the instrumentality with respect to a surface type cover, means on the box for directly securing either type cover thereto, and a single manipulable means mounting the pan to the box and manipulable to effect positive movement of the pan relative to the box in at least a forward direction to properly locate the instrumentality with respect to the position of the flush type cover.

8. Supporting and enclosing means for an electric circuit controlling instrumentality comprising an enclosing box, a front cover for said box, a pan supporting said instrumentality and slidably mounted within the box for movement in opposite directions in a path perpendicular to the back wall of the box, an adjusting screw having opposed annular abutments and a portion threaded into the box, the base of said pan having a key-hole opening receiving said screw and in operating position having said annular abutments disposed respectively in front and in back of the portions of the pan defining the narrower part of said key-hole opening, rotation of said screw relative to said pan and box effecting positive movement of the pan in said opposite directions in said path through the engagement of said abutments with the pan.

9. Supporting and enclosing means for an electric circuit controlling instrumentality comprising an enclosing box, a front cover for said box, a generally L-shaped pan having its base disposed substantially parallel to the back wall of the box and carrying said instrumentality thereon and having its leg slidably engageable with the side wall of the box, guide means rigid with the side wall of the box and engaging said leg for limiting movement of the pan to a direction perpendicular to the back wall of the box, and a single manipulable screw rotatably engageable with said pan and threaded into a part rigid with said box, said screw having its axis substantially in line with the center of mass of the electric circuit controlling instrumentality, manipulation of said screw effecting positive movement of the pan relative to the box to properly locate the instrumentality with respect to the position of the front cover.

10. Supporting and enclosing means for an electric circuit controlling instrumentality comprising an enclosing box, a generally L-shaped pan supporting said instrumentality within said box and having its leg engageable with a side wall of the box, guide means rigid with the box side wall and engaging said leg for guiding the movement of the pan relative to the box, and an adjusting screw threaded into said box, the base of said pan having a keyhole opening therein engaging the adjusting screw between opposed abutments thereon to effect movement of the pan relative to the box as the screw is rotated to properly locate the instrumentality with respect to the cover.

JOHN G. JACKSON.
RALPH H. KINGDON.